US005806139A

United States Patent [19]

Anderson et al.

[11] Patent Number: 5,806,139

[45] Date of Patent: Sep. 15, 1998

[54] GROMMET ASSEMBLY

[75] Inventors: Warren J. Anderson, South Lyon; Brian J. Wild, Ferndale, both of Mich.

[73] Assignee: Hi-Lex Corporation, Battle Creek, Mich.

[21] Appl. No.: 637,246

[22] Filed: Apr. 24, 1996

[51] Int. Cl.[6] .............................. F16L 5/00; H01B 17/26

[52] U.S. Cl. .................... 16/2.1; 16/DIG. 42; 174/153 G

[58] Field of Search ................................ 16/2.1, 2.2, 2.5, 16/DIG. 42; 174/65 G, 152 G, 153 G

[56] References Cited

U.S. PATENT DOCUMENTS

| | | | |
|---|---|---|---|
| 2,664,458 | 12/1953 | Rapata | 16/2.5 |
| 3,244,802 | 4/1966 | Sturtevant et al. | 16/2.2 |
| 3,424,857 | 1/1969 | Miller et al. | 16/2.2 |
| 3,542,980 | 11/1970 | Hamilton | 287/20 |
| 3,843,833 | 10/1974 | Nicholson | 16/2.1 |
| 3,885,767 | 5/1975 | Olowinski et al. | 248/204 |
| 4,089,496 | 5/1978 | Mizusawa | 16/2.1 |
| 4,180,297 | 12/1979 | Abrams | 174/153 G |
| 4,624,585 | 11/1986 | Nix et al. | 384/296 |
| 4,750,878 | 6/1988 | Nix et al. | 384/296 |
| 4,763,541 | 8/1988 | Spease | 74/501 R |
| 5,144,777 | 9/1992 | Fishel et al. | 16/2.1 |

FOREIGN PATENT DOCUMENTS

| | | | |
|---|---|---|---|
| 623471 | 10/1962 | Belgium | 174/153 G |

OTHER PUBLICATIONS

0580130 A1, European Patent Application, pub. Jan. 26, 1994 Inventor: Akio Kato et al.

*Primary Examiner*—Chuck Mah
*Assistant Examiner*—Donald M. Gurley
*Attorney, Agent, or Firm*—Young & Basile, P.C.

[57] ABSTRACT

A grommet assembly for sealingly mounting elongated elements in an aperture in a panel such as the dash panel of a motor vehicle. The grommet assembly includes inner and outer grommet members which are relatively telescopically arranged. The outer grommet member has a rearwardly opening cup shaped configuration, is formed of a resilient material, and includes a tapered forward portion sized to fit in the panel aperture. The inner grommet member has a forwardly opening cup shaped configuration, is formed of a rigid material, and includes an annular wall telescopically received within the annular wall of the outer grommet member and engaging a front wall of the outer grommet member at a location forwardly of the annular groove. The tapered forward portion is initially positioned in the panel aperture in frictional engagement with the aperture whereafter a pushing force is applied on the rear end of the inner grommet member to pull the forward end of the outer grommet member through the panel aperture and seat the circumferential groove in the panel aperture. An opening in the inner grommet member communicates with an opening in the front wall of the outer grommet member to allow the elongated element to pass sequentially through the openings in the inner and outer grommet members. The grommet assembly is especially suitable for use where the panel aperture is difficult to access such as where a thick layer of insulation is positioned in surrounding relation to the panel aperture for sound deadening purposes.

16 Claims, 3 Drawing Sheets

FIG-4
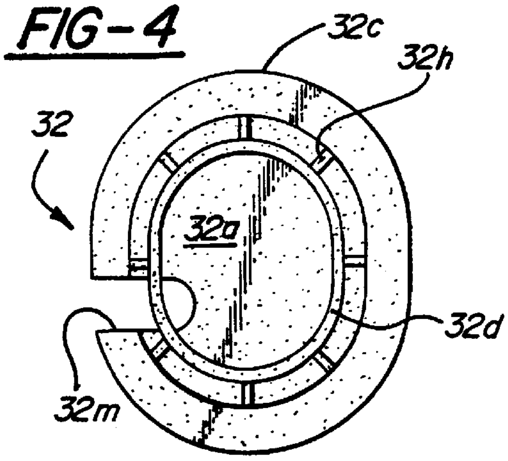
FIG-5
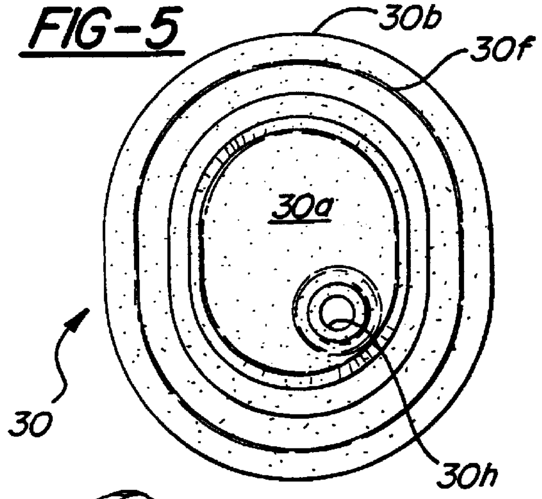
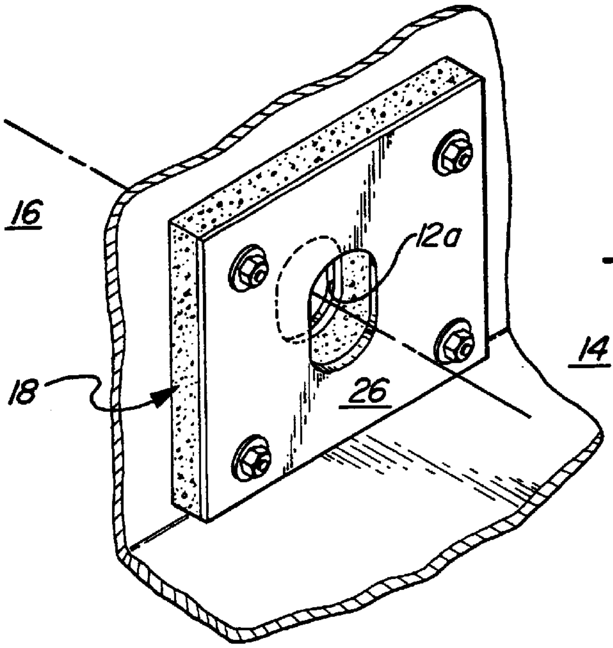
FIG-6
FIG-7
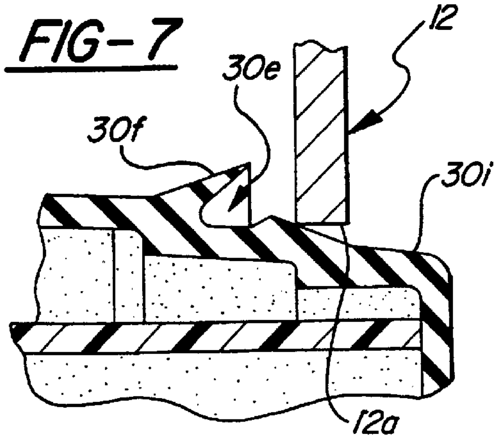
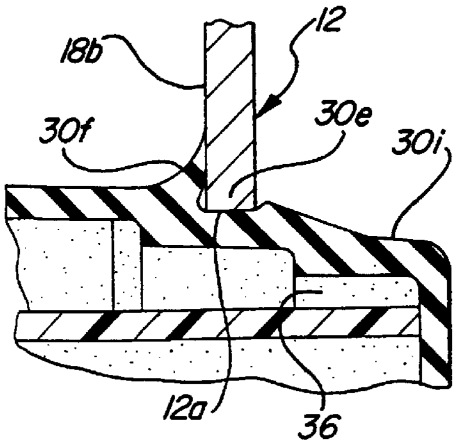
FIG-8

GROMMET ASSEMBLY

BACKGROUND OF THE INVENTION

This invention relates to grommet assemblies and more particularly to grommet assemblies especially suitable for use in passing an elongated element through an aperture in a panel.

There are myriad industrial applications in which it is desirable to pass an elongated element such as a wire, cable, conduit, pipe or hose through an aperture in a panel. For example, in the assembly of a motor vehicle, it is necessary to pass cables, wires, etc. through the dash panel of the vehicle from the passenger compartment into the engine compartment. It is necessary that a seal be maintained between the dash panel and the element as the element passes through the panel to ensure that contaminants from the engine compartment are precluded from entering the passenger compartment. It is desirable that a grommet assembly operate to facilitate such passage and provide quick and positive installation, especially in situations where, in the interest of precluding the transmission of sound between the engine compartment and the passenger compartment through the panel aperture, a relatively thick layer of insulation material is positioned on the passenger compartment side of the dash panel through which the elongated element must pass and in consideration of which the installation of the grommet assembly must be performed.

SUMMARY OF THE INVENTION

This invention is directed to the provision of an improved grommet assembly.

More specifically, this invention is directed to the provision of a grommet assembly which is especially suitable for facilitating the passage of elongated elements through a partition of a motor vehicle.

More specifically, this invention is directed to the provision of a grommet assembly that is especially suitable for passing elongated elements through an aperture in the dash panel of a motor vehicle and through an insulation layer associated with the aperture in the dash panel.

The grommet assembly of the invention is intended to facilitate the passage of an elongated element through an aperture in a panel. According to the invention, the grommet assembly includes an outer grommet member and an inner grommet member. The outer grommet member is formed of a resilient material and includes a forward portion sized to fit in the aperture, an external circumferential groove positioned rearwardly of the forward portion and sized to seat an edge of the panel aperture, and an opening sized to axially pass the elongated element. The inner grommet member is formed of a stiff material, has an opening to axially pass the elongated element, and is sized to fit telescopically within the outer grommet member with a forward end thereof positioned in proximity to an inner transverse surface proximate the forward portion of the outer grommet member and a rearward end thereof positioned proximate a rearward end of the outer grommet member and defining a rearwardly facing push surface. With the forward portion of the outer grommet member positioned in the panel aperture and the circumferential groove positioned immediately rearward of the panel aperture, the inner grommet member is operative in response to a forward pushing force applied against the push surface to move the outer grommet member forwardly and move the circumferential groove into seating engagement with the edge of the panel aperture. This arrangement provides a quick and positive positioning of the aperture edge in the circumferential groove even in scenarios where it is difficult to gain direct access to the panel aperture.

According to a further feature of the invention, the outer grommet member has a generally rearwardly opening cup configuration; the inner grommet member fits telescopically into the open rear end of the outer grommet member; the forward portion of the outer grommet member is tapered radially inwardly to facilitate piloting insertion of the outer grommet member into the panel aperture; and the forward end of the inner grommet member has a radial clearance with the forward portion of the outer grommet member. This arrangement allows radial contraction of the forward portion of the outer grommet member as it passes forwardly through the panel aperture to facilitate mounting of the grommet assembly in the aperture.

According to a further feature of the invention, the rearward end of the inner grommet member has a tight frictional fit with the rearward end of the outer grommet member. This arrangement maintains the inner grommet member in telescopic relation with the outer grommet member.

According to a further feature of the invention, the grommet assembly is intended for use with an insulation layer positioned against the rearward face of the panel and including an aperture aligned with the panel aperture; the outer grommet member includes an external circumferential flange at a rear end thereof; and the circumferential groove is spaced forwardly from the external circumferential flange by a distance to accommodate the insulation layer with the external circumferential flange engaging the rear face of the insulation layer. This arrangement facilitates the installation of the grommet even in situations where the panel aperture is difficult to access due to the insulation layer positioned against the rearward face of the panel.

According to a further feature of the invention, the main body member further includes an external circumferential lip positioned immediately rearwardly of the circumferential groove. This arrangement allows the circumferential lip to coact with the circumferential groove to firmly and sealingly grasp the edge of the panel aperture.

The invention also provides a methodology for providing a grommet for passage of an elongated element through an aperture in a panel. The invention methodology comprises providing an outer grommet member of resilient material including an external circumferential groove sized to seat an edge of the panel aperture, a radially inwardly tapering forward portion forwardly of the groove having the general configuration of the panel aperture, and a passage opening in a rear face of the grommet member and extending forwardly within the grommet member to a transverse inner surface located forwardly of the circumferential groove; providing an inner grommet member of rigid material including an axially extending pusher portion sized to fit in the passage and presenting a rearwardly facing push surface proximate a rearward end of the inner grommet member; positioning the outer grommet member in the aperture with the forward portion positioned in the panel aperture in frictional engagement with the edge of the panel aperture and the circumferential groove positioned immediately rearwardly of the panel aperture; inserting the pusher portion of the inner grommet member into the passage and into engagement with the transverse inner surface; and applying a forward pushing force against the push surface to move the outer grommet member forwardly and seat the edge of the panel aperture in the circumferential groove. This methodology provides a ready and efficient means of quickly and positively seating a grommet in a panel aperture even in environments where the panel aperture is difficult to access.

BRIEF DESCRIPTION OF THE DRAWINGS

FIG. 4 is a front view of an inner grommet member employed in the invention grommet assembly;

FIG. 5 is a rear view of an outer grommet member employed in the invention grommet assembly;

FIG. 6 is a somewhat schematic perspective view of a motor vehicle dash panel with associated sound insulation;

FIGS. 7 and 8 are successive views showing the installation of the invention grommet assembly in a panel aperture.

DETAILED DESCRIPTION OF THE PREFERRED EMBODIMENT

Figure 1:
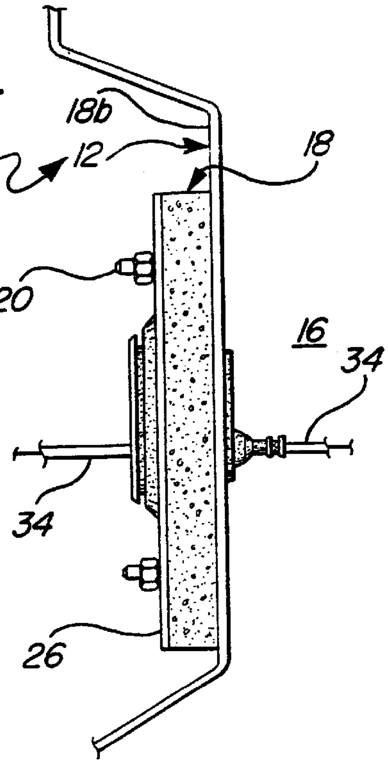
FIG. 1 is a somewhat schematic view showing a control cable passing through the dash panel of a motor vehicle utilizing a grommet assembly according to the invention.
Figure 3:
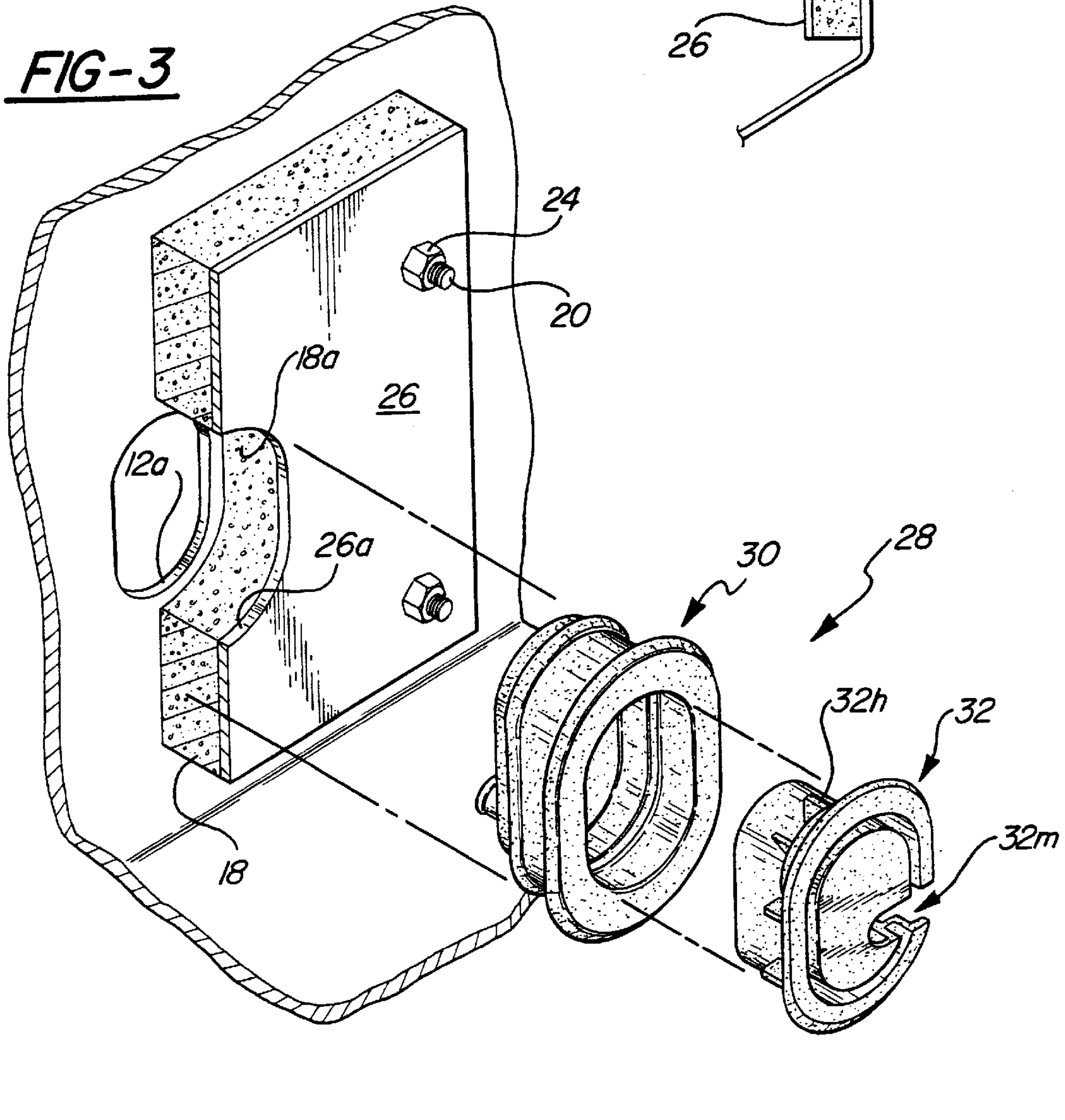
FIG. 3 is an exploded perspective view of the invention grommet assembly.

The invention grommet assembly is shown in the drawings in association with a motor vehicle of the type including an instrument panel 10 and a dash panel 12 separating the passenger compartment 14 of the vehicle from the engine compartment 16 of the vehicle. It is common to run cables, wires, etc. from the passenger compartment to the engine compartment passing through the dash panel utilizing a grommet structure which allows passage of the elongated element through an aperture in the dash panel but provides a seal as between the engine compartment and the passenger compartment. It is also becoming increasingly common to provide a layer of sound-deadening insulation 18 in surrounding relation to the aperture 12*a* in the dash panel to lessen the transfer of noise between the passenger compartment and the engine compartment through the aperture 12*a*. As shown, the layer of insulation 18 includes an aperture 18*a* generally corresponding in size and configuration to the panel aperture 12*a* and held in place against the rear or passenger side 18*b* of the dash panel by studs 20 projecting rearwardly from the dash panel for passage through spools 22 for engagement with nuts 24. The spools 22 include rearward flanges 22*a* which engage a trim panel 26 which in turn holds the insulation layer 18 in position against the rear face of the dash panel.

The invention grommet assembly 28 is especially suitable for use in facilitating the passage of an elongated element through a dash panel aperture associated with an insulation layer and includes an outer or main body grommet member 30 and an inner grommet member, or driver member, 32.

Outer grommet member 30 is formed in an injection molding operation of a suitable resilient material such as EPDM rubber and has a rearwardly opening cup-shaped configuration corresponding generally to the configuration of the panel aperture 12*a*. For example, panel aperture 12*a*, insulation layer aperture 18*a*, and trim panel aperture 26*a* may have an oblong configuration and grommet member 30 may have a generally corresponding oblong cross-sectional configuration.

Member 30 includes a front end wall 30*a* at the front end of the member, an external circumferential flange 30*b* at the rear end of the member including a circumferential sealing lip 30*c*, an annular side wall 30*d* extending between the flange 30*b* and the front end wall 30*a*, an external circumferential groove 30*e* in the annular side wall positioned rearwardly of the front end wall 30*a* and forwardly of flange 30*b* and adapted to be seated in panel aperture 12*a*, an external circumferential lip 30*f* on the annular side wall 30*d* immediately rearwardly of circumferential groove 30*e*, and a nipple 30*g* integral with front end wall 30*a* and defining an opening 30*h* for axial passage of the elongated element such, for example, as a Bowden control cable 34 extending for example between the shift lever in the passenger compartment and the transmission select lever in the engine compartment. Groove 30*e* preferably has a diameter that is slightly greater than the diameter of panel aperture 12*a* (for example 1 mm greater) so that the groove has a radial interference fit with the panel aperture.

Figure 9:
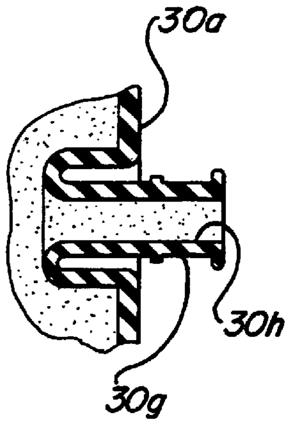
FIG. 9 is a view showing a detail of the outer grommet member.
Figure 2:
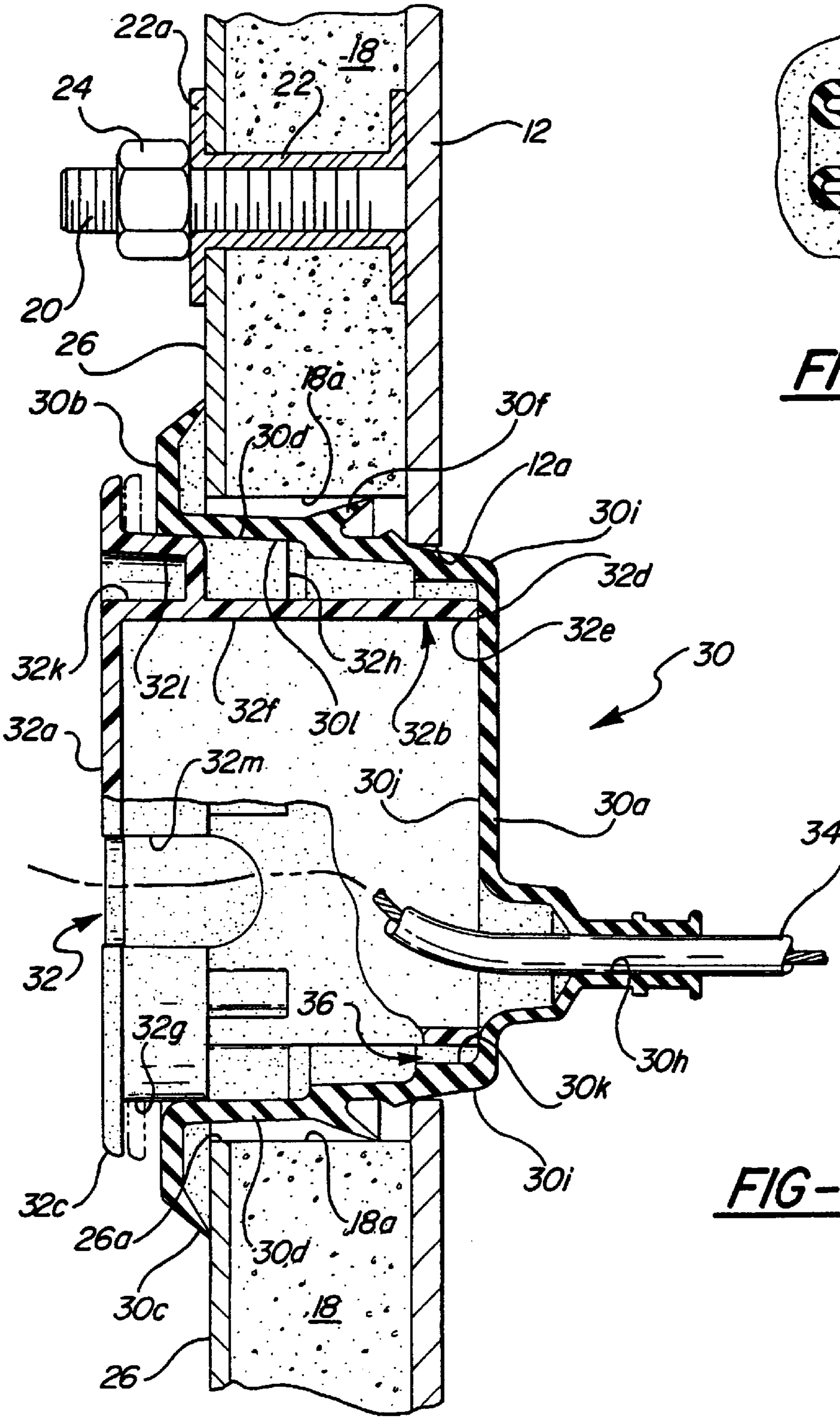
FIG. 2 is a cross-sectional view of the invention grommet assembly.

Nipple 30*g* is moveable from a retracted position seen in FIG. 9, to an extended position seen in FIG. 2 so as to allow the cable to leave the grommet member at a significant angle from the axial without putting any force on the sealing interface between the grommet and the panel aperture. Annular side wall 30*d* will be seen to define a passage opening in the rear face of the outer grommet member and extending forwardly within the outer grommet member to a transverse inner surface defined by the inner or rear face 30*j* of front end wall 30*a*. The forward portion 30*i* of the annular side wall 30*d* between the circumferential groove 30*e* and the front end wall 30*g* tapers radially inwardly for piloting insertion of the forward portion into the panel aperture 12*a*.

Inner grommet member 32 is formed in an injection molding process of a rigid material such as mineral filled Nylon and has a forwardly opening cup shaped configuration with an oblong cross-sectional configuration corresponding generally to the oblong cross-sectional configuration of the outer grommet member and the oblong cross-sectional configuration of apertures 12*a*, 18*a* and 26*a*. Inner grommet member 32 has a rear end wall 32*a* at the rear end of the member, an annular side wall 32*b* extending forwardly from the rear end wall 32*a* and sized to fit telescopically within the annular side wall 30*d* of the outer grommet member, and an external circumferential flange 32*c* proximate the rear end of the inner grommet member and having an outer diameter greater than the inner diameter of the external flange 30*b* of the outer grommet member. Side walls 30*d* and 32*b* are relatively dimensioned such that, with the annular front edge 32*d* of annular side wall 32*b* positioned against the inner face 30*j* of the outer grommet member front end wall 30*a*, inner grommet member flange 32*c* is positioned rearwardly of the external flange 30*b* of the outer grommet member. Annular side wall 30*d* of the inner grommet member will be seen to define an axially extending pusher portion of the inner grommet member sized to fit in the passage defined by the annular side wall 30*d* of the outer grommet member.

The forward end 32*e* of inner grommet member annular wall 32*b* defines a radial clearance 36 with the annular inner surface 30*k* of the forward portion 30*i* of the annular side wall of the outer grommet member to allow radial contraction of the forward portion of the outer grommet member even with the inner grommet member positioned telescopically within the outer grommet member, and the rear end 32*f* of the annular wall 32*b* of the inner grommet member is radially enlarged to define a forwardly tapering annular wedge 32*g* for frictional wedging coaction with the forwardly tapering inner surface 30*l* of the rear end portion of the annular side wall of the outer grommet member. Coacting surfaces 30g and 30l define a tight frictional fit between the inner and outer grommet members to maintain the inner and outer grommet members in telescopic relation following insertion of the inner grommet member into the outer grommet member. A plurality of circumferentially spaced fins 32h radiate from the annular wall of the inner grommet member and extend forwardly from wedge surface 32g to provide a forward continuation of wedge surface 32g for coaction with the wedge surface 30l on the annular wall of the outer grommet member, and an annular groove 32k is provided in the rear end wall 32a of the inner grommet member to define an outer annular wall 32l separated from the main body of annular wall 32b by groove 32k. An opening 32m in the end wall 32a and the adjacent side wall 32f provides axial passage of cable 34 for subsequent passage through opening 30h of nipple 30g.

In the operation of the invention grommet assembly, inner grommet member 32 is positioned telescopically within outer grommet member 30, the elongated element such as control cable 34 is passed through aperture 32m in the inner grommet member and through opening 30h in the outer grommet member to position the forward end 34a of the cable in appropriate axial relation to the grommet assembly and thereby to the dash panel, the assembled grommet and control cable are passed forwardly by an installer situated in passenger compartment 14 from the passenger compartment through the aligned apertures 26a, 18a and 12a to position the forward end 34a of control cable 34 in its appropriate position within the engine compartment and to position the tapered forward portion 30i of the outer grommet member in panel aperture 12a in frictional engagement with the edge of the panel aperture and position circumferential groove 30e immediately rearwardly of the panel aperture, as best seen in FIG. 7.

At this time, the installer positioned in the passenger compartment applies a forward pushing force against the push surface 32a to push the forward annular edge 32d of inner grommet annular wall 32b against outer grommet end wall 30a and thereby move the outer grommet member forwardly to seat the edge of panel aperture 12a in the circumferential groove 30e with a radial interference fit of, for example 1 mm, and with circumferential lip 30f pressing firmly against the rear face 18b of the panel to complete the sealed installation of the grommet in the panel aperture.

The final forward movement of the outer grommet member into sealing engagement with the panel aperture following the initial insertion of the grommet assembly and cable into the panel aperture is shown in successive FIGS. 7 and 8. As seen in FIG. 7, the initial installation, provided for example by a forward pushing movement exerted on the cable by the installer positioned in the passenger compartment, positions the tapered forward portion 30i of the outer grommet member in frictional engagement with the edge 12a of the panel aperture but further forward movement of the outer grommet member to move groove 30e into sealing engagement with panel aperture 12a is very difficult based on simply a forward thrusting force applied to the cable 34 or a general pushing movement applied to the rear end of the grommet assembly.

However, groove 30e may be moved readily and quickly into sealing engagement with the aperture 12a by a pushing force applied against inner grommet member push surface 32a. This force exerted against surface 32a initially stretches the forward portion 30i of the outer grommet member forwardly and thereafter pulls the outer grommet member forwardly to snap groove 30e into seating engagement with aperture 12a. This final forward movement of the forward portion of the outer grommet member into seating engagement with aperture 12a is made possible by the radial contraction of the forward portion 30i which in turn is made possible by the radial clearance 36 between the forward portion 30i and the associated portion of the annular wall of the inner grommet member. The final snapping movement of the groove 30e into engagement with panel aperture 12 is accompanied by movement of annular lip 30f into sealing engagement with the rear face of panel 12 proximate panel aperture 12a. Lip 30f provides a secondary seal with respect to the panel aperture and helps prevent pushing the grommet too far forwardly relative to the panel.

The final disposition of the members is best seen in FIG. 8 wherein aperture opening 12a is firmly and positively positioned within groove 30e with a radial interference fit and coacts with sealing lip 30f to preclude the passage of contaminants or other noxious elements from the engine compartment into the passenger compartment. In the final configuration of the parts, the lip 30c on the flange of the outer grommet member is firmly and sealingly engaged with the rear surface of trim panel 26 and the external flange 32c of the inner grommet member is moved into proximity with the external flange 30b of the outer grommet member. The inner and outer grommet members are held in their telescopic relative positions by the frictional engagement of the enlarged wedge shaped rear end 32f of the inner grommet member with the corresponding wedge surface 30l provided by the annular side wall of the outer grommet member proximate the rear end of the outer grommet member.

The invention will be seen to provide an improved grommet assembly which is suitable for sealingly positioning elongated members in panel apertures and which is especially suitable for use in sealingly seating elongated members in panel apertures where the apertures are difficult to access such as in situations where an insulation layer surrounds the aperture.

Whereas a preferred embodiment of the invention has been illustrated and described in detail, it will be apparent that various changes may be made in the disclosed embodiment without departing from the scope or spirit of the invention.

What is claimed is:

1. A grommet assembly to facilitate the passage of a control cable through an aperture in a panel from a rearward area on one side of the panel aperture to a forward area on the other side of the panel aperture, characterized in that:

the grommet assembly includes an outer grommet member of resilient material including a forward portion sized to fit in the aperture, an external circumferential sealing surface positioned rearwardly of the forward portion and sized to sealingly engage an edge of the panel aperture, and an opening sized to axially pass the control cable and an inner grommet member constituted as a totally separate member from the outer grommet member, formed of a material that is stiffer than the resilient material of the outer grommet member, having an opening to axially pass the control cable and sized to fit telescopically within the outer grommet member with a rearward end thereof positioned proximate a rearward end of the outer grommet member and defining a rearwardly facing push surface; and means operative, with the forward portion of the outer grommet member positioned in the panel aperture and the sealing surface positioned immediately rearwardly of the panel aperture, in response to a forward pushing force applied against the push surface to pull the outer grommet member forwardly and move the circumferential sealing surface into sealing engagement with the edge of the panel aperture.

2. A grommet assembly according to claim 1 wherein:

the outer grommet member has a generally rearwardly opening cup configuration;

the inner grommet member fits telescopically into the open rear end of the outer grommet member;

the forward portion of the outer grommet member is tapered radially inwardly to facilitate piloting insertion of the outer grommet member into the panel aperture; and the forward end of the inner grommet member has a radial clearance with the forward portion of the outer grommet member to allow radial contraction of the forward portion of the outer grommet member as it passes forwardly through the panel aperture.

3. A grommet assembly according to claim 2 wherein:

the rearward end of the inner grommet member has a tight frictional fit with the rearward end of the outer grommet member to maintain the inner grommet member in telescopic relation with the outer grommet member.

4. A grommet assembly according to claim 1 wherein:

the inner grommet member includes a forward end positioned in proximity to an inner transverse surface of the outer grommet member located forwardly of the sealing surface; and the operative means comprises the forward end of the inner grommet member pushing against the inner transverse surface of the outer grommet member in response to a forward pushing force applied against the push surface.

5. A grommet assembly to facilitate the passage of a control cable through an aperture in a panel, the assembly comprising:

a main body, generally cup-shaped member of resilient material and including an annular side wall, a front end wall at a forward end of the side wall, an external circumferential sealing surface on the side wall spaced rearwardly from the front end wall and sized to seat an edge of the panel aperture, and an external circumferential flange at a rearward end of the side wall;

a driver member of rigid material having a forwardly extending pusher portion sized to fit telescopically within the annular side wall of the main body member with a radial clearance therebetween forwardly of the circumferential sealing surface so as to allow radial contraction of the side wall of the main body member forwardly of the circumferential sealing surface;

an opening in the front end wall of the main body member sized to pass the control cable;

an opening in the driver member sized to pass the control cable for subsequent passage through the opening in the front end wall of the main body member; and coacting surface means on the forward end of the driver member and on the interior of the main body member forwardly of the sealing surface operative in response to a forward pushing force applied to a rearward end of the driver member to push the main body member forwardly and pull the circumferential sealing surface into sealing engagement with the edge of the panel aperture.

6. A grommet assembly according to claim 5 wherein the portion of the annular side wall between the circumferential sealing surface and the front end wall is tapered radially inwardly to facilitate piloting insertion of the forward end of the main body member into the panel aperture.

7. A grommet assembly to facilitate the passage of an elongated element through an aperture in a panel and through an aligned aperture in an insulation layer positioned adjacent a rear face of the panel, the assembly comprising:

an outer grommet member having a rearwardly opening cup shaped configuration, formed of a resilient material, and sized to fit in the panel aperture and in the insulation layer aperture, the outer grommet member including a front end wall at a front end of the outer grommet member, an external circumferential flange at a rear end of the outer grommet member for engagement with a rear face of the insulation layer, an annular side wall extending between the flange and the front end wall, an external circumferential groove in the annular side wall positioned rearwardly of the front end wall and forwardly of the external flange, an external circumferential lip on the annular side wall immediately rearwardly of the circumferential groove, and an opening in the front end wall to pass the elongated element, the forward portion of the annular side wall between the circumferential groove and the front end wall tapering radially inwardly for piloting insertion of the forward portion into the panel aperture; and an inner grommet member having a forwardly opening cup shaped configuration and formed of a rigid material, the inner grommet member having a rear end wall at a rear end of the inner grommet member, an annular side wall extending forwardly from the rear end wall and sized to fit, with the members assembled, telescopically within the annular side wall of the outer grommet member, and an external circumferential flange proximate the rear end of the inner grommet member having an outer diameter greater than an inner diameter of the external flange of the outer grommet member and positioned, with the members assembled, rearwardly of the external flange of the outer grommet member, the annular side wall of the inner grommet member having a front annular edge positioned, with the members assembled, proximate the rear face of the front end wall of the outer grommet member, defining a radial clearance with the forward portion of the outer grommet member to allow radial contraction of the forward portion of the outer grommet member, and defining a frictional fit with the annular side wall of the outer grommet member proximate the rear end of the outer grommet member to maintain the inner and outer grommet members in telescopic relation.

8. A method of providing a grommet for passage of a control cable through an aperture in a panel, the method comprising:

providing an outer grommet member of relatively resilient material including an external circumferential sealing surface sized to seat sealingly against an edge of the panel aperture, a forward portion forwardly of the sealing surface having the general configuration of the panel aperture, and a passage opening in a rear face of the grommet member and extending forwardly within the grommet member to a transverse inner surface located forwardly of the sealing surface;

providing an inner grommet member of relatively rigid material presenting a rearwardly facing push surface proximate a rearward end of the inner grommet member and including an axially forwardly extending pusher portion sized to fit in the passage;

positioning the outer grommet member in the aperture with the forward portion positioned in the panel aperture in frictional engagement with the edge of the panel aperture and the sealing surface positioned immediately rearwardly of the panel aperture;

inserting the pusher portion of the inner grommet member into the passage and into engagement with the transverse inner surface;

sizing the inner and outer grommet members to provide a radial clearance between the pusher portion of the inner grommet member and the forward portion of the outer grommet member;

applying a forward pushing force against the push surface to exert a pushing force on the transverse inner surface to pull the forward portion of the outer grommet member forwardly through the aperture to seat the edge of the panel aperture on the sealing surface with the radial clearance allowing radial contraction of the forward portion as the forward portion moves forwardly through the aperture;

providing the outer grommet member with an opening sized to axially pass the control cable;

providing the inner grommet member with an opening sized to axially pass the control cable; and passing the control cable through the openings in the inner and outer grommet members.

9. A method according to claim 8 wherein the outer grommet member is positioned in the aperture following passage of the control cable through the openings in the inner and outer grommet members.

10. A grommet assembly to facilitate the passage of an elongated element through an aperture in a panel, characterized in that:

the grommet assembly includes an outer grommet member of relatively resilient material including a forward portion sized to fit in the aperture, an external circumferential groove positioned rearwardly of the forward portion and sized to seat an edge of the panel aperture, and an opening sized to axially pass the elongated element, and an inner grommet member of relatively stiff material having an opening to axially pass the elongated element and sized to fit telescopically within the outer grommet member with a forward end thereof positioned in proximity to an inner transverse surface proximate the forward portion of the outer grommet member and a rearward end thereof positioned proximate a rearward end of the outer grommet member and defining a rearwardly facing push surface;

with the forward portion of the outer grommet member positioned in the panel aperture and the circumferential groove positioned immediately rearwardly of the panel aperture, the inner grommet member is operative in response to a forward pushing force applied against the push surface to move the outer grommet member forwardly and move the circumferential groove into seating engagement with the edge of the panel aperture;

the grommet assembly is intended for use with an insulation layer position against the rearward face of the panel and including an aperture aligned with the panel aperture;

the outer grommet member includes an external circumferential flange at a rear end thereof;

the circumferential groove is spaced forwardly from the external circumferential flange by a distance to accommodate the insulation layer so that the external circumferential flange engages the rear face of the insulation layer with the grommet assembly installed; and the forward portion of the outer grommet member is tapered radially inwardly to facilitate piloting insertion of the outer grommet member into the panel aperture and facilitate forward movement of the forward portion of the outer grommet member through the panel aperture.

11. A grommet assembly to facilitate the passage of an elongated element through an aperture in a panel, the assembly comprising:

a main body, generally cup-shaped member of resilient material and including an annular side wall, a front end wall at the forward end of the side wall, an external circumferential groove in the side wall spaced rearwardly from the front end wall and sized to seat an edge of the panel aperture, and an external circumferential flange at the rearward end of the side wall;

a driver member of rigid material having a forwardly extending pusher portion sized to fit telescopically within the annular side wall of the main body member with a radial clearance therebetween forwardly of the circumferential groove so as to allow radial contraction of the side wall of the main body member forwardly of the circumferential groove and a rear external flange portion proximate a rear end of the driver member having an outer diameter greater than the inner diameter of the main body flange;

an opening in the front end wall of the main body member sized to pass the elongated element; and an opening in the driver member sized to pass the elongated element for subsequent passage through the opening in the front end wall of the main body member;

the circumferential groove of the main body member being spaced forwardly from the external flange of the main body member; and the main body member further including an external circumferential lip positioned immediately rearwardly of the circumferential groove.

12. A grommet assembly to facilitate the passage of an elongated element through an aperture in a panel, the assembly comprising:

a main body, generally cup-shaped member of resilient material and including an annular side wall, a front end wall at the forward end of the side wall, an external circumferential groove in the side wall spaced rearwardly from the front end wall and sized to seat an edge of the panel aperture, and an external circumferential flange at the rearward end of the side wall;

a driver member of rigid material having a forwardly extending pusher portion sized to fit telescopically within the annular side wall of the main body member with a radial clearance therebetween forwardly of the circumferential groove so as to allow radial contraction of the side wall of the main body member forwardly of the circumferential groove and a rear external flange portion proximate a rear end of the driver member having an outer diameter greater than the inner diameter of the main body flange;

an opening in the front end wall of the main body member sized to pass the elongated element; and an opening in the driver member sized to pass the elongated element for subsequent passage through the opening in the front end wall of the main body member;

the circumferential groove of the main body member being spaced forwardly from the external flange of the main body member;

the main body member further including an external circumferential lip positioning immediately rearwardly of the circumferential groove; and the portion of the annular side wall between the circumferential groove and the front end wall being tapered radial inwardly to facilitate piloting insertion of the forward end of the main body member into the panel aperture.

13. A grommet assembly according to claim 12 wherein the rearward end of the driver member has a tight frictionally fit within a rearward end of the main body member to maintain the driver member in telescopic relation with the main body member.

14. A grommet assembly to facilitate the passage of a control cable through an aperture in a panel from a rearward area on one side of the panel aperture to a forward area on the other side of the panel aperture, characterized in that the grommet assembly includes:

an outer grommet member of relatively resilient material including a forward portion sized to fit in the aperture, an external circumferential sealing surface positioned rearwardly of the forward portion and sized to sealingly engage an edge of the panel aperture, and an opening sized to axially pass the control cable;

an inner grommet member constituted as a totally separate member from the outer grommet member, formed of a material that is stiffer than the resilient material of the outer grommet member, having an opening sized to axially pass the control cable and sized to fit telescopically within the outer grommet member; and driver means operative in response to a forward pushing force applied against the inner grommet member from a location on the rearward side of the panel aperture to pull the outer grommet member forwardly and pull the circumferential sealing surface into sealing engagement with the edge of the panel aperture.

15. A grommet assembly according to claim 14 wherein:

the inner grommet member includes a forward end positioned in proximity to an inner transverse surface proximate the forward portion of the outer grommet member and a rearward end positioned proximate a rearward end of the outer grommet member and defining a rearwardly facing push surface;

with the forward portion of the outer grommet member positioned in the panel aperture and the sealing surface positioned immediately rearwardly of the panel aperture, the inner grommet member is operative in response to a forward pushing force applied against the push surface to pull the outer grommet member forwardly and pull the circumferential sealing surface into sealing engagement with the edge of the panel aperture.

16. A method of facilitating the passage of a control cable through an aperture in a panel, comprising the steps of:

providing an outer grommet member of relatively resilient material including a forward portion sized to fit in the aperture, an external circumferential sealing surface positioned rearwardly of the forward portion and sized to seat sealingly against the edge of the panel aperture, an internal transverse surface forwardly of the sealing surface, and an opening sized to axially pass the elongated element;

providing an inner grommet member of relatively rigid material having an opening to axially pass the elongated element, sized to fit telescopically within the outer grommet member, having a forward portion defining a forward push surface, and having a rearward end defining a rearward push surface;

positioning the forward portion of the outer grommet member in the panel aperture with the circumferential sealing surface positioned immediately rearwardly of the panel aperture;

positioning the inner grommet member telescopically within the outer grommet member with the forward push surface positioned proximate the internal transverse surface and the rearward push surface positioned proximate a rearward end of the outer grommet; and exerting a forward pushing force against the rearward push surface to exert a pushing force on the internal transverse surface and pull the outer grommet member forwardly and pull the circumferential sealing surface forwardly into seating sealing engagement with the edge of the panel aperture.

* * * * *